(12) United States Patent
Tahara

(10) Patent No.: US 6,946,752 B2
(45) Date of Patent: Sep. 20, 2005

(54) INPUT POWER STABILIZING CIRCUIT

(75) Inventor: Hiromitsu Tahara, Miyagi (JP)

(73) Assignee: NEC Communication Systems, Ltd., Tokyo (JP)

( * ) Notice: Subject to any disclaimer, the term of this patent is extended or adjusted under 35 U.S.C. 154(b) by 448 days.

(21) Appl. No.: 10/119,735

(22) Filed: Apr. 11, 2002

(65) Prior Publication Data
US 2002/0149266 A1 Oct. 17, 2002

(30) Foreign Application Priority Data
Apr. 12, 2001 (JP) ........................................ 2001/114535

(51) Int. Cl.$^7$ ............................................... H01H 00/00
(52) U.S. Cl. ...................... 307/134; 307/138; 307/100; 307/413
(58) Field of Search .................................. 307/7, 127

(56) References Cited

U.S. PATENT DOCUMENTS

| | | | |
|---|---|---|---|
| 4,218,719 A | * | 8/1980 | Tsai ............................ 361/82 |
| 5,726,505 A | * | 3/1998 | Yamada et al. ............. 307/127 |

FOREIGN PATENT DOCUMENTS

| | | |
|---|---|---|
| JP | 55-143629 | 11/1980 |
| JP | 59-161622 | 10/1984 |
| JP | 60-174431 | 11/1985 |
| JP | 8-140281 | 5/1996 |
| JP | 8-236161 | 9/1996 |
| JP | 8-250158 | 9/1996 |

OTHER PUBLICATIONS

Japanese Office Action dated Mar. 9, 2004 with Partial English Translation.

* cited by examiner

*Primary Examiner*—Robert L. Deberadinis
(74) *Attorney, Agent, or Firm*—McGinn & Gibb, PLLC

(57) ABSTRACT

An input power stabilizing circuit, adapted to be disposed between a DC power source and a load to which DC power from the source is to be supplied. Voltage on a capacitor in the input power stabilizing circuit is prevented as much as possible from causing reverse current to flow when the DC power source develops a short circuit momentarily. A current detecting unit detects reverse current from the capacitor in an input power supply line, and a current interrupting unit interrupts a current line connecting the load with the DC power source. When reverse current flow is detected, the current line is interrupted by the current detecting unit and the current interrupting unit. The reverse current from the capacitor is held to a minimum value in the input power stabilizing circuit.

22 Claims, 3 Drawing Sheets

INPUT POWER STABILIZING CIRCUIT

BACKGROUND OF THE INVENTION

The present invention relates to an input power stabilizing circuit, in which a reverse current, discharged from a capacitor in the input power stabilizing circuit, is prevented as much as possible, at the time when an input power supply line has some trouble, such as a momentary short circuit.

DESCRIPTION OF THE RELATED ART

Recently, the power consumption of apparatuses has been increased, and solutions have been required when troubles occur by outside causes. One of the troubles may be that an input power supply line becomes a short circuit momentarily. A diode is generally used in an input power stabilizing circuit as a solution to prevent a reverse current from flowing in the input power stabilizing circuit at the time when the input power supply line has some trouble such as a momentary short circuit.

FIG. 1 is a circuit diagram in which a conventional input power stabilizing circuit is connected to a direct current (DC) power source and a load. As shown in FIG. 1, a DC power source 1 is connected to a load 2 via an input power stabilizing circuit 15. The input power stabilizing circuit 15 includes a capacitor 3, an inductor 16, and a diode 14. A DC voltage from the DC power source 1 is charged on the capacitor 3, and the capacitor 3 supplies the charged voltage to the load 2 when impedance in the load 2 is changed. The inductor 16 filters out noise from the current inputted from the DC power source 1. If the input power supply line between terminals "a" and "b" becomes a short circuit, the diode 14 prevents a reverse current from the "b" terminal "b" to the "d" terminal "d", which was discharged from the capacitor 3.

In an input power stabilizing circuit using a diode, when a large current flows, heating caused by the large current becomes a big problem. This problem is explained by using the circuit diagram shown in FIG. 1. Since a current always flows in the diode 14, electric power, being the product of forward voltage and forward current of the diode 14, is always consumed. This electric power is wasteful and also causes a large amount of heating in the input power stabilizing circuit 15 when the load 2 draws a large current. Consequently, there is a problem that a structure for dissipating the heat in the input power stabilizing circuit 15 must have a large size, and its manufacturing cost becomes high.

SUMMARY OF THE INVENTION

It is therefore an object of the present invention to provide an input power stabilizing circuit, to be disposed between a DC power source and an apparatus that is powered by the DC power from the source, that can prevent a reverse current from flowing from a capacitor in the input power stabilizing circuit as much as possible when the DC power source has some trouble, such as the DC input terminals developing a short circuit momentarily, and that also can reduce the power consumption of the input power stabilizing circuit as much as possible at the normal operating time of the input power stabilizing circuit. Moreover, the input power stabilizing circuit of the present invention significantly reduces the amount of heat generated in the circuit, and its heat radiating structure is of a small size, and also its manufacturing cost is made to be low.

According to a first aspect of the present invention, for achieving the object mentioned above, there is provided an input power stabilizing circuit, which is to be disposed between a DC power source and a load to which the DC power from the source is supplied. The input power stabilizing circuit includes a voltage storing means which stores a voltage supplied from the DC power source, supplies the stored voltage to the load when a trouble has occurred at the side of the DC power source, and stabilizes the voltage input to the load, a current detecting means which detects a reverse current from the voltage storing means in an input power supply line through which a current from the DC power source to the load is supplied, and a current interrupting means which interrupts a current line connecting the load with the DC power source, when the reverse current has been detected by the current detecting means.

According to a second aspect of the present invention, in the first aspect, the current detecting means includes a current transformer whose primary side is connected to the input power supply line, and a first transistor whose gate is made to be on or off by a voltage generated at the secondary side of the current transformer.

According to a third aspect of the present invention, in the second aspect, the current detecting means further provides a diode which rectifies the voltage generated at the secondary side of the current transformer, a capacitor which smoothes the voltage rectified at the diode, and a first voltage divider which divides the voltage smoothed at the capacitor and takes out a first designated voltage. The first transistor becomes "on" when the voltage divided at the first voltage divider is applied to the gate of the first transistor, and this "on" state of the first transistor is applied to the current interrupting means.

According to a fourth aspect of the present invention, in the third aspect, the current interrupting means includes a second voltage divider which divides the voltage inputted from the DC power source and takes out a second designated voltage, and a second transistor which is disposed in the current line connecting the load with the DC power source. The gate of the second transistor is made to be on or off by the voltage taken out from the second voltage divider. The second transistor is made to be "off" when the voltage from the second voltage divider has not been applied to the gate of the second transistor, and the current line is interrupted.

According to a fifth aspect of the present invention, in the fourth aspect, the first transistor short circuits the ends of one of resistors of which the second voltage divider is composed, and stops applying the voltage from the second voltage divider to the gate of the second transistor.

According to a sixth aspect of the present invention, in the first aspect, the input power stabilizing circuit further includes an inductor which delays the reverse current from the voltage storing means in the input power supply line.

According to a seventh aspect of the present invention, in the second aspect, the current detecting means includes plural current transformers in the input power supply line in parallel, and detects the reverse current from the voltage storing means.

According to an eighth aspect of the present invention, in the second aspect, the current detecting means includes plural current transformers in the input supply line in series, and detects the reverse current from the voltage storing means.

According to a ninth aspect of the present invention, in the first aspect, the voltage storing means discharges the reverse current to the input power supply line when the output terminals of the DC power source became a short circuit.

BRIEF DESCRIPTION OF THE DRAWINGS

The objects are features of the present invention will become more apparent from the consideration of the following detailed description taken in conjunction with the accompanying drawings, in which.

DESCRIPTION OF THE PREFERRED EMBODIMENTS

Figure 1:
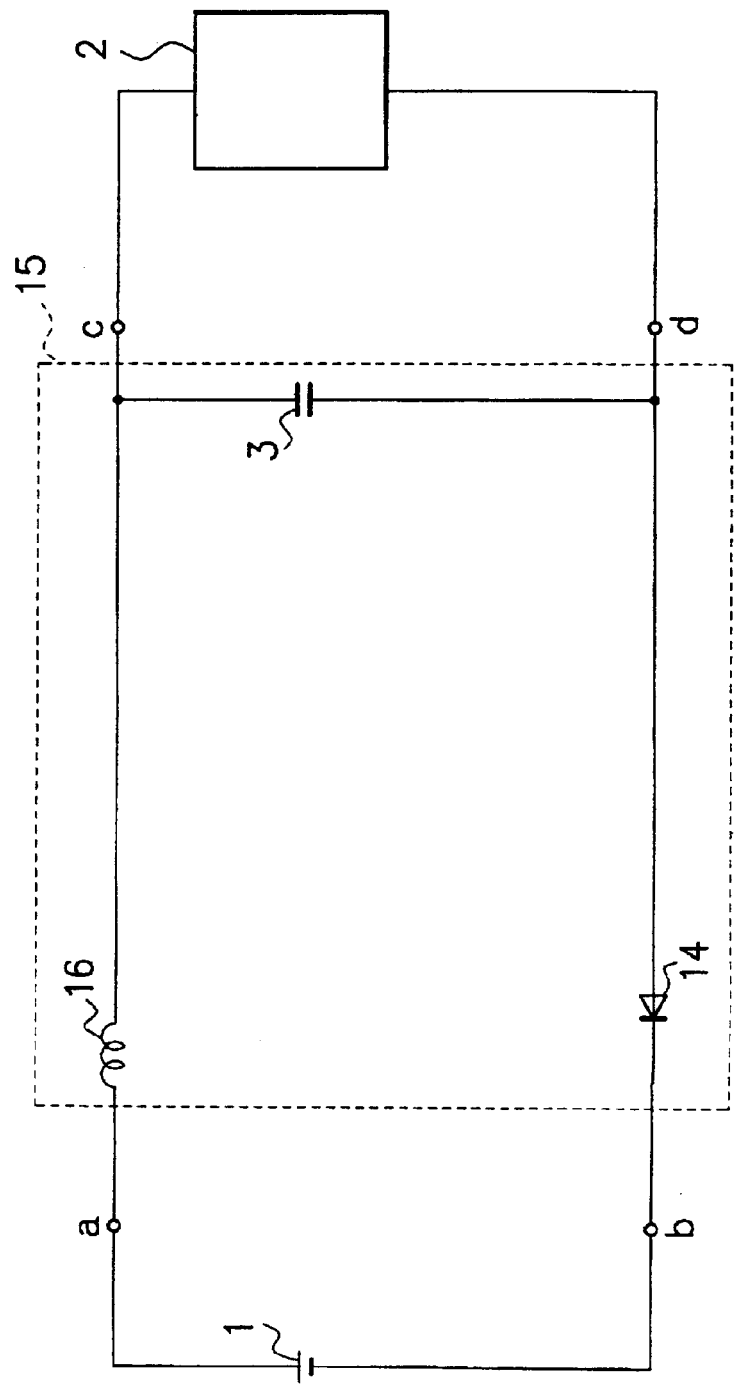
FIG. 1 is a circuit diagram in which a conventional input power stabilizing circuit is connected to a DC power source and a load.

Referring now to the drawings, embodiments of the present invention are explained in detail. In the embodiments of the present invention, the reference number of each function has the same number that the conventional example has, when the function in the embodiments of the present invention is almost the same as the conventional example. The input power stabilizing circuit in the embodiments of the present invention has also the same reference numbers, but its structure is different from that of the conventional example.

Figure 2:
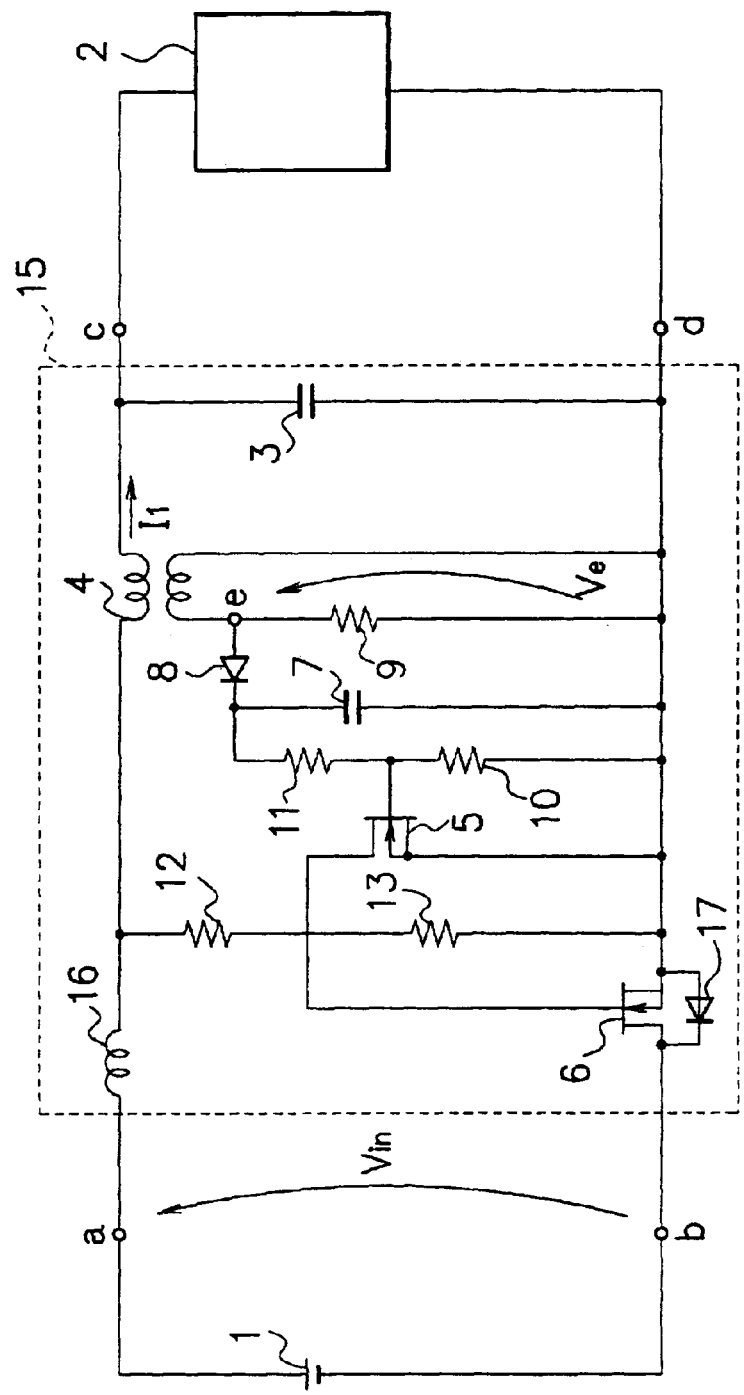
FIG. 2 is a circuit diagram in which an input power stabilizing circuit in accordance with a first embodiment of the present inventions is connected to a DC power source and a load.

FIG. 2 is a circuit diagram in which an input power stabilizing circuit in accordance with a first embodiment of the present inventions is connected to a DC power source and a load. As shown in FIG. 2, a DC power source 1 is connected to a load 2 via an input power stabilizing circuit 15. The input power stabilizing circuit 15 includes a first capacitor 3, a current transformer 4, first and second transistors 5 and 6, a second capacitor 7, a diode 8, first, second, third, fourth, and fifth resistors 9,10,11,12, and 13, an inductor 16, and a parasitic diode 17.

The first capacitor 3 stores a DC voltage from the DC power source 1, and supplies the stored voltage to the load 2 when the impedance in the load 2 is changed.

The current transformer 4 detects a reverse current in the input power supply line. Since a current $I_1$ is generally flowing from the "a" terminal to the "c" terminal at the primary side of the current transformer 4, the current transformer 4 is in a magnetic saturation state. Consequently, a current is not generated at the secondary side of the current transformer 4.

The diode 8 rectifies a voltage generated at the secondary side of the current transformer 4. The second capacitor 7 holds the peak value of the voltage rectified at the diode 8 and smoothes the voltage.

The second resistor 10 and the third resistor 11 are connected in series, and work as a first voltage divider. A voltage that is a desired ratio of the voltage rectified and smoothed at the diode 8 and the second capacitor 7 is taken out at the tap between the second resistor 10 and the third resistor 11.

The voltage divided at the first voltage divider (the second and third resistors 10 and 11) is applied to the gate of the first transistor 5. Since a voltage is not being applied to the gate of the first transistor 5 during normal operation, the first transistor 5 is kept in an "off" state.

The fourth resistor 12 and the fifth resistor 13 are connected in series, and work as a second voltage divider. A voltage that is a desired ratio of the voltage Vin is taken out at the tap between the fourth resistor 12 and the fifth resistor 13.

The voltage divided at the second voltage divider (the fourth and fifth resistors 12 and 13) is applied to the gate of the second transistor 6. Since a voltage is being applied to the gate of the second transistor 6 during normal operation, the second transistor 6 is kept in an "on" state.

The inductor 16 has an inductance value equivalent to the inductance value from the terminal "a" to the terminal "c", and filters out noise from the current inputted from the DC power source 1. The inductor 16 also works to delay the reverse current from the first capacitor 3. Therefore, the characteristics of the inductor 16 are based on the time from when the current transformer 4 has detected the reverse current to when the second transistor 6 is made to be "off".

The parasitic diode 17 works to supply the inputted voltage to the load 2, irrespective of whether the second transistor 6 is "on" or "off". However, during normal operation, the inputted current flows through the second transistor 6 and does not flow through the parasitic diode 17.

In the embodiments of the present invention, a field effect transistor (FET) is used for both of the first and second transistors 5 and 6, for the following reason. It is desirable that the time, from when the current transformer 4 detects the reverse current to when the second transistor 6 is made to be "off" is as close to zero possible, in order to make the reverse current discharged from the first capacitor 3 be a minimum value. Therefore, in order to make the time be the minimum value, the FET is the most suitable, because the FET can realize a high speed switching by controlling the voltage of the gate. However, the first and second transistors 5 and 6 are not limited to a FET; a bipolar transistor can be used for the first and second transistors 5 and 6.

Next, operation of the input power stabilizing circuit of the first embodiment of the present invention is explained. A case in which the input terminals "a" and "b" of the input power stabilizing circuit 15 became a short circuit momentarily is explained.

First, when the terminals "a" and "b" become a short circuit, electric charge stored on the first capacitor 3 starts to flow to the input side terminal "a" via the current transformer 4.

During the time for the current transformer 4 to reach a magnetic saturation state in the reverse direction, a voltage of Ve is generated by the first resistor 9 at the secondary side of the current transformer 4 at the tap "e", "e" due to this reverse current from the first capacitor 3. This generated voltage Ve is rectified by the diode 8 and is smoothed at the second capacitor 7. This smoothed voltage is divided by the first voltage divider (the second and third resistors 10 and 11), and the divided voltage is applied to the gate of the first transistor 5. When the first transistor 5 becomes "on" due to the gate voltage, the ends of the fifth resistor 13 are short circuited.

The input voltage Vin, divided by the second voltage divider (the fourth and fifth resistors 12 and 13), has been applied to the gate of the second transistor 6. When the ends of the fifth resistor 13 are short circuited by the first transistor 5, the gate voltage of the second transistor 6 becomes zero, and the second transistor 6 becomes "off".

By the operation mentioned above, the reverse current from the terminal "b" to the terminal "d" is prevented by the "off" state of the second transistor 6, and the discharge from the first capacitor 3 becomes small enough.

The length of time required for the current transformer 4 to reach the magnetic saturation state in the reverse direction, depends on the characteristics of the inductor 16. When the short circuit has been corrected, that is, the input voltage has recovered, the power is supplied to the load 2 via the parasitic diode 17, irrespective of the "on" or "off" state of the second transistor 6. However, soon after the recovery, the second transistor 6 becomes "on" "on," and current flows through the second transistor 6.

Further, when a reverse voltage is applied to the input power stabilizing circuit 15, caused by an error in wiring at the input power supply line, the gate of the second transistor 6 is reverse biased and keeps transistor 6 in the "off" state. Therefore, the input power stabilizing circuit 15 also works as a protection circuit for a circuit following the input power stabilizing circuit 15.

Figure 3:
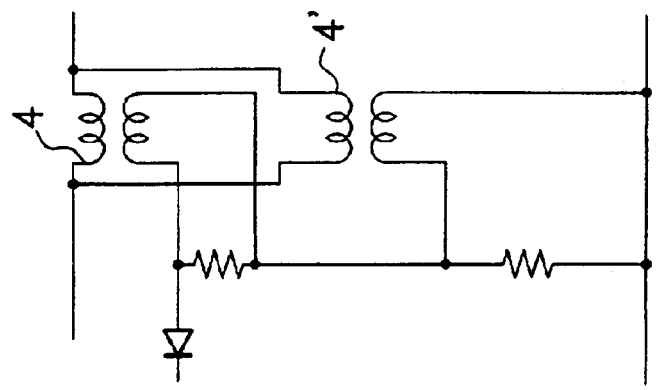
FIG. 3 is a circuit diagram showing a reverse current detecting section in an input power stabilizing circuit in accordance with a second embodiment of the present invention.

Next, referring to the drawing, a second embodiment of the present invention is explained. FIG. 3 is a circuit diagram showing a reverse current detecting section in an input power stabilizing circuit of the second embodiment of the present invention. As shown in FIG. 3, in the second embodiment, plural current transformers are provided in the input power stabilizing circuit. That is, in the second embodiment, a current transformer 4 and a current transformer 4' are provided. The primary sides of the current transformers 4 and 4' are connected in parallel, and the secondary sides of the current transformers 4 and 4' are connected in series.

In the second embodiment of the present invention, a large current can be detected, and even when the reverse current flowing in the current transformers 4 and 4' is unequal, the reverse current can be detected by the total amount of the reverse currents.

Figure 4:
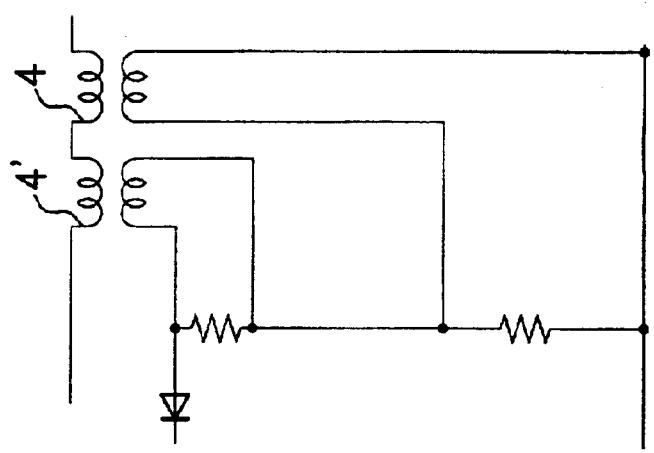
FIG. 4 is a circuit diagram showing a reverse current detecting section in an input power stabilizing circuit in accordance with a third embodiment of the present invention.

Next, referring to the drawing, a third embodiment of the present invention is explained. FIG. 4 is a circuit diagram showing a reverse current detecting section in an input power stabilizing circuit of the third embodiment of the present invention. As shown in FIG. 4, at the third embodiment, plural current transformers are also provided in the input power stabilizing circuit. That is, in the third embodiment, a current transformer 4 and a current transformer 4' are provided, as in the second embodiment. However, the connection between the current transformers 4 and 4' is different from the second embodiment. That is, the primary sides of the current transformers 4 and 4' are connected in series, and the secondary sides of the current transformers 4 and 4' are connected in series.

In the third embodiment of the present invention, since the primary sides of the current transformers 4 and 4' are connected in series, the detecting voltage can be twice as great as in the first and second embodiments, and the current sensitivity can easily be made to be high. With this embodiment, even when the reverse current discharged from the first capacitor 3 is very small, the voltage applied to the gate of the first transistor 5 is of a high value, within the operation characteristics of the first transistor 5, controlling the on/off state of the first transistor 5.

As mentioned above, according to the present invention, when a reverse current is detected in the input power supply line, the current line is made to be "off". With this, a discharge from a capacitor in the input power stabilizing circuit, caused by, for example, a momentary short circuit of the input power supply line, can be made to be a minimum value.

In the conventional input power stabilizing circuit used a diode, since current always flowing in the diode, electric power being the product of forward voltage and forward current of the diode is always consumed. This electric power is wasteful and causes significant heating in the input power stabilizing circuit when the load current is large. Consequently, there is a problem that a structure for radiating the heat must be of a large size, and its manufacturing cost becomes high. However, according to the present invention, the loss is only caused by "on" resistance of the second transistor, and in the normal operating state a current does not flow through a parasitic diode of the second transistor. Therefore, the amount of heating is significantly reduced, compared with the case in which a diode was used, as mentioned at the conventional example, and its heat radiating structure can be small, and the manufacturing cost is low in the present invention.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. An input power stabilizing circuit, adapted to be disposed between a DC power source and a load to which DC power from said source is to be supplied through an input power supply line and a current line, said input power stabilizing circuit comprising:
   a voltage storing unit which stores voltage supplied from the DC power source, supplies the stored voltage to the load when a trouble has occurred, and stabilizes the voltage input to the load;
   a current detecting unit which detects a reverse current from said voltage storing unit in the input power supply line; and
   a current interrupting unit, responsive to detection of the reverse current, to interrupt the current line.

2. An input power stabilizing circuit in accordance with claim 1, wherein said current detecting unit comprises:
   a current transformer having its primary side connected in the input power supply line; and
   a first transistor having a gate connected to receive a voltage generated at the secondary side of said current transformer.

3. An input power stabilizing circuit in accordance with claim 2, wherein said current detecting unit further comprises:
   a diode which rectifies the voltage generated at said secondary side of said current transformer;
   a capacitor which smoothes the voltage rectified by said diode; and
   a first voltage divider which divides the voltage smoothed by said capacitor and takes out a first designated voltage, wherein:
      said gate of said first transistor switches said first transistor "on" when the voltage taken out from said first voltage divider is applied to said gate of said first transistor, and the "on" state of said first transistor activates said current interrupting unit.

4. An input power stabilizing circuit in accordance with claim 3, wherein said current interrupting unit comprises:
   a second voltage divider which divides the voltage inputted from the DC power source and takes out a second designated voltage; and
   a second transistor which is disposed in the current line, said second transistor having a gate connected to receive the voltage taken out from said second voltage divider, wherein:

said second transistor is switched "off" when said second voltage divider applies substantially no voltage to said gate of said second transistor, interrupting the current line.

5. An input power stabilizing circuit in accordance with claim 4, wherein:

said second voltage divider comprises two serially-connected resistors, and in the "on" state, said first transistor provides a short circuit across the ends of one of said resistors, interrupting the voltage from said second voltage divider to said gate of said second transistor.

6. An input power stabilizing circuit in accordance with claim 5, wherein said voltage storing unit is responsive to a short circuit across output terminals of the DC power source, to discharge said voltage storing unit, causing reverse current to flow in the input power supply line.

7. An input power stabilizing circuit in accordance with claim 2, wherein said current detecting unit comprises plural current transformers in the input power supply line in parallel.

8. An input power stabilizing circuit in accordance with claim 7, wherein said current detecting unit further comprises:

a diode which rectifies the voltage generated at the secondary sides of said current transformers;

a capacitor which smoothes the voltage rectified by said diode; and a first voltage divider which divides the voltage smoothed by said capacitor and takes out a first designated voltage, wherein:

said gate of said first transistor switches said first transistor "on" when the voltage taken out from said first voltage divider is applied to said gate of said first transistor, and the "on" state of said first transistor activates said current interrupting unit.

9. An input power stabilizing circuit in accordance with claim 8, wherein said current interrupting unit comprises:

a second voltage divider which divides the voltage inputted from the DC power source and takes out a second designated voltage; and a second transistor which is disposed in the current line, said second transistor having a gate connected to receive the voltage taken out from said second voltage divider, wherein:

said second transistor is switched "off" when said second voltage divider applies substantially no voltage to said gate of said second transistor, interrupting the current line.

10. An input power stabilizing circuit in accordance with claim 9, wherein:

said second voltage divider comprises two serially-connected resistors, and in the "on" state, said first transistor provides a short circuit across the ends of one of said resistors, interrupting the voltage from said second voltage divider to said gate of said second transistor.

11. An input power stabilizing circuit in accordance with claim 7, wherein said voltage storing unit is responsive to a short circuit across output terminals of the DC power source, to discharge said voltage storing unit, causing reverse current to flow in the input power supply line.

12. An input power stabilizing circuit in accordance with claim 2, wherein said voltage storing unit is responsive to a short circuit across output terminals of the DC power source, to discharge said voltage storing unit, causing reverse current to flow in the input power supply line.

13. An input power stabilizing circuit in accordance with claim 2, wherein said current detecting unit comprises plural current transformers in the input power supply line in series.

14. An input power stabilizing circuit in accordance with claim 13, wherein said current detecting unit further comprises:

a diode which rectifies the voltage generated at said secondary sides of said current transformers;

a capacitor which smoothes the voltage rectified by said diode; and a first voltage divider which divides the voltage smoothed by said capacitor and takes out a first designated voltage, wherein:

said gate of said first transistor switches said first transistor "on" when the voltage taken out from said first voltage divider is applied to said gate of said first transistor, and the "on" state of said first transistor activates said current interrupting unit.

15. An input power stabilizing circuit in accordance with claim 14, wherein said current interrupting unit comprises:

a second voltage divider which divides the voltage inputted from the DC power source and takes out a second designated voltage; and a second transistor which is disposed in the current line, said second transistor having a gate connected to receive the voltage taken out from said second voltage divider, wherein:

said second transistor is switched "off" when said second voltage divider applies substantially no voltage to said gate of said second transistor, interrupting the current line.

16. An input power stabilizing circuit in accordance with claim 15, wherein:

said second voltage divider comprises two serially-connected resistors, and in the "on" state, said first transistor provides a short circuit across the ends of one of said resistors, interrupting the voltage from said second voltage divider to said gate of said second transistor.

17. An input power stabilizing circuit in accordance to claim 13, wherein said voltage storing unit is responsive to a short circuit across output terminals of the DC power source, to discharge said voltage storing unit, causing reverse current to flow in the input power supply line.

18. An input power stabilizing circuit in accordance with claim 1, further comprising:

an inductor which delays the reverse current, in said input power supply line, from said voltage storing unit.

19. An input power stabilizing circuit in accordance with claim 1, wherein said voltage storing unit is responsive to a short circuit across output terminals of the DC power source, to discharge said voltage storing unit, causing reverse current to flow in the input power supply line.

20. An input power stabilizing circuit in accordance with claim 1, wherein said current interrupting unit comprises:

a voltage divider which divides the voltage inputted from the DC power source and takes out a designated voltage; and a transistor which is disposed in the current line, said transistor having a gate connected to receive the voltage taken out from said voltage divider, wherein:

said transistor is switched "off" when said voltage divider applies substantially no voltage to said gate of said transistor, interrupting the current line.

21. An input power stabilizing circuit in accordance with claim 20, wherein:

said voltage divider comprises two serially-connected resistors, and said current detecting unit is responsive to detection of the reverse current to cause a short circuit across the ends of one of said resistors, interrupting the voltage from said voltage divider to said gate of said transistor.

22. A method of stabilizing input power between a DC power source and a load to which DC power from the source is to be supplied through an input power supply line and a current line, said method comprising:

storing voltage supplied from the DC power source, for supplying to the load when a trouble has occurred;

detecting a reverse current from the voltage storing unit in the input power supply line; and in response to detection of the reverse current, interrupting the current line.

* * * * *